J. J. ORBICK.
NUT LOCK.
APPLICATION FILED AUG. 22, 1916.
1,218,454.
Patented Mar. 6, 1917.
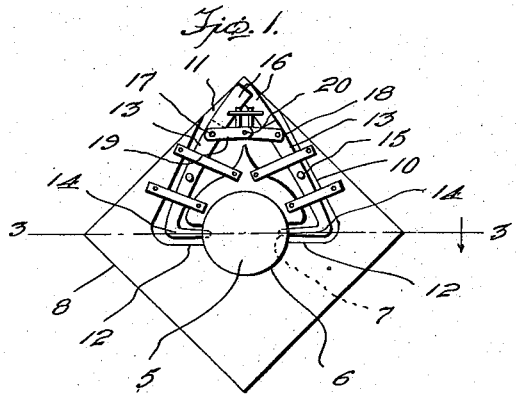
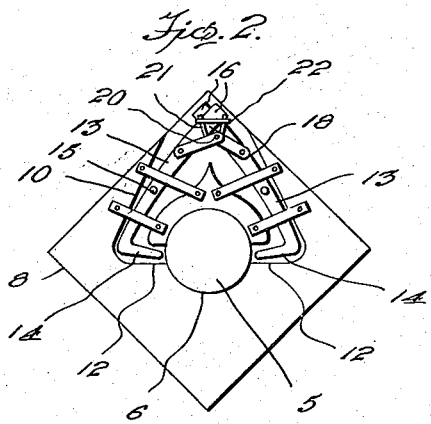
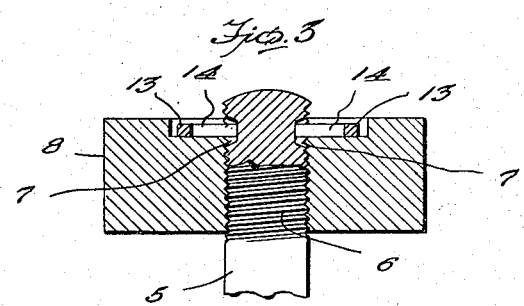
Witnesses
Inventor
John J. Orbick.
By John Louis Waters & Co.
Attorney

UNITED STATES PATENT OFFICE.

JOHN J. ORBICK, OF HURLEY, WISCONSIN.

NUT-LOCK.

1,218,454.  Specification of Letters Patent.  Patented Mar. 6, 1917.

Application filed August 22, 1916. Serial No. 116,372.

*To all whom it may concern:*

Be it known that I, JOHN J. ORBICK, a citizen of the United States, residing at Hurley, in the county of Iron and State of Wisconsin, have invented certain useful Improvements in Nut-Locks, of which the following is a specification, reference being had therein to the accompanying drawing.

This invention relates to improvements in nut locks, one object of the invention being the provision of a lock in which the nut carries two pivoted pawls or dogs mounted in a peculiar manner and operably connected together so that the same are moved into and out of engagement with ratchet teeth formed in the threaded portion of the nut, thus providing an easily manipulated member for locking the nut against rotation or for releasing the same for rotation.

A further object of this invention is the provision of a device of this character which is simple, durable and inexpensive in construction and thoroughly efficient and practical in use.

In the accompanying drawings:—

Figure 1 is a plan view of a nut provided with the present lock, showing the end of the bolt in place and engaged by the pawls.

Fig. 2 is a similar view showing the pawls released.

Fig. 3 is a cross section on line 3—3 of Fig. 1.

Referring to the drawings, the numeral 5 designates the bolt, whose threaded end 6 is provided with a plurality of ratchet grooves 7.

The nut 8 is interiorly screw threaded, as is usual, and is provided upon one face thereof with the recess 10 which is open as at 11 at one corner thereof and also opens at diametrically opposite points, as at 12, adjacent the bore of the nut.

Mounted in said recess for swinging movement are the two pawls 13, each one of which is provided with a hooked terminal 14 for movement into and out of engagement with the ratchet grooves of the nut.

These pawls are pivoted intermediate of the ends by means of pins or other fastening devices 15, and have their reduced ends 16 overlapping each other.

Pivotally connected by means of pins or other fastening devices 17 to each of the pawls are the respective outer terminals 18 of the links 19 which are pivotally connected intermediate of their ends by means of the pin or other fastening device 20.

Each link is provided with an apertured lug or handle 21 which is here shown connected together by a wire fastening 22.

When the two links are fully extended, the outer ends of the pawls are also extended, while the hooked terminals are pressed inwardly and caused to engage the ratchet grooves at diametrically opposite points of the bolt, and thus hold the nut against inturning.

To release the pawls from engagement with the bolt, it is merely necessary to pull the links toward the outer ends of the pawls, at which time the links collapse and pull inwardly the outer ends of the pawls, and produce an outward movement of the hook ends of the pawls.

In order to hold the pawls properly seated within the recess, the retaining plates 23 are provided and are secured to the central substantially Y-shaped portion 24 of the nut and to the body thereof.

It is also possible to incase the slot with the plate, so that the only portions that are exposed therethrough are the handles for manipulating the links.

What I claim as new is:—

The combination with a bolt having a plurality of longitudinally disposed ratchet grooves, of a nut having a threaded bore to receive the bolt and provided with a slot entering the bore at diametrically opposite points, two pawls pivoted intermediate of their ends and mounted in said groove, the hooked terminals thereof being disposed for projection into the bore, and a pair of toggle links pivotally connected to the outer terminals of the pawls and adapted to be extended and collapsed for placing the hooked terminals into and out of engagement with the grooves of the bolt.

In testimony whereof I affix my signature.

JOHN J. (X) ORBICK.
his  mark

Witness to his mark:
J. C. FLANAGAN.

Copies of this patent may be obtained for five cents each, by addressing the "Commissioner of Patents, Washington, D. C."